United States Patent Office 2,841,631
Patented July 1, 1958

2,841,631

STORAGE BATTERY PASTE FORMULATION

Harold E. Zahn, Buffalo, N. Y., assignor to Gould-National Batteries, Inc., St. Paul, Minn.

No Drawing. Application March 1, 1955
Serial No. 491,511

6 Claims. (Cl. 136—26)

This invention relates generally to lead-acid storage batteries, and more particularly to an improved battery plate paste formulation therefor.

Reduction of the rate of corrosion of the lead or lead-alloy positive grids in such storage battery cells has long been a problem to the industry. Solution of the problem has been previously sought through modifications of the grid alloy metal and/or by addition to the battery electrolyte of substances designed to resist such corrosion. For example, it has been previously proposed to add cobalt sulphate or other suitable cobalt salts to the electrolyte, but where separators of wood or other cellulose materials are used in such batteries it has been found that the separators suffer premature failure due to their inability to withstand the deteriorating effect thereon caused by the presence of the cobalt.

A primary object of this invention is to provide an improved means and method for employing cobalt in a lead-acid storage battery in such manner as to effectively lower the rate of corrosion of the grid metal without causing an incidental breakdown of the battery separators such as commonly occurs in the presence of cobalt.

Another object of the invention is to provide an improved paste formulation for lead acid storage batteries using separators of wood or other cellulose material, which will provide protection for the positive grid metal to prevent corrosion thereof, while at the same time avoiding acceleration of separator deterioration.

For the above stated purposes, the invention contemplates addition of a suitable source of cobalt and silver, such as cobaltous sulphate ($CoSO_4 \cdot 7H_2O$) and such as silver sulphate in predetermined percentages to the battery paste formulation, so as to retain only the preservative qualities of each. It appears that the cobalt and silver, when thus combined in an otherwise conventional paste formulation enables the cobalt to protect the positive grid metal against corrosion while at the same time the silver acts to overcome the tendencies of the cobalt to deleteriously affect the separators of the subsequently assembled battery.

To obtain the benefits of the invention, cobalt sulphate may be added for example to the positive grid paste in varying percentages up to 0.5% by weight. While effective results are apparently obtained with a percentage range of the cobalt sulphate between 0.005% and 0.5%, amounts in excess of 0.08% apparently do not appreciably increase corrosion resistance. Silver sulphate may be added to the grid paste in percentages up to 0.5% by weight. When both sulphates are thus used within the percentage limits stated they combine in providing within the battery paste a protective coating for the positive grid metal which is apparently much more effective than when either additive is used alone. Furthermore, the silver counteracts the effect of the cobalt on the separators and is particularly effective where the silver is present in greater quantity than is the cobalt. For example, a preferred formulation has been found to comprise approximately 0.25% silver sulphate and 0.07% cobalt sulphate.

While the cobalt and silver salts may be each introduced within the ranges described hereinabove, it will be understood that a primary function of the silver is to overcome the deteriorating effect which the cobalt would otherwise have upon the separators. Accordingly, the percentage of silver sulphate should be increased or decreased as the cobalt sulphate addition is increased or decreased.

While I have hereinabove specifically referred to the introduction of cobalt and silver to the paste, in the sulphate form, I do not intend to exclude the possibility of adding them in the form of nitrates, chlorides, or in other compounds. The sulphates are probably preferred, however, due to the fact that sulphuric acid is normally used in preparing the battery paste.

Whereas, it has been previously suggested to provide certain additives in storage battery electrolyte solutions with a view to retarding corrosion of the battery grid metal, in the case of the present invention addition of cobalt and silver to the battery paste formulation provides vastly improved results because the cobalt and silver salt concentrations are highest at the surfaces of the grid metal parts requiring protection from corrosion. Furthermore, when a storage battery grid embodying the present invention is initially processed electrolytically (i. e. "formation"), the protective action of the cobalt and silver salts relative to the grid metal develops immediately, as distinguished from some subsequent time when the battery has initial processing electrolyte replaced with one containing the protective salts. Inasmuch as the cobalt and silver salts are the relatively expensive ingredients of the battery construction, the present invention may provide substantial manufacturing economies because the protective metal ions are concentrated in the areas where they are mostly needed instead of being wastefully distributed throughout the electrolyte.

The invention also contemplates preparation of an improved battery oxide formulation in dry powder form, to include (in addition to the usual oxide formulation) the preferred percentages of cobalt and silver sulphate, or the like, as explained hereinabove. Thus, an improved dry powder formulation may be prepared in accord with the present invention and packaged in dry form and shipped or stored until ready for use in preparing "paste" by addition of acid solution or water in the conventional manner, to be then fabricated into a battery plate. Thus, the cobalt and silver sulphate ingredients may be readily admixed with the lead oxide material which is conventionally employed, and may thus be more easily dispersed thoroughly and intimately throughout the oxide, without problems of segregation or precipitation separation such as are usually encountered when working with solutions. Furthermore, the complete composition in dry powder form in accord with the present invention, may with utmost facility be precisely controlled and formulated by relatively inexpert personnel, thereby insuring uniformly accurate fabrication of finished battery plates.

The invention further contemplates introduction of the cobalt and silver to the "paste" component of the battery plate through the medium of the acid and/or water which is used to "wet" the dry oxide formulation in preparing the plate "paste." Thus, the cobalt and silver compounds may be added to the water and/or acid to be used in making the paste for the battery plate, and will thus be thoroughly dispersed throughout the lead "oxide" formulation and hence brought into immediate intimate contact with the grid metal when the grid is "pasted"; as explained hereinabove.

I claim:

1. In a lead-acid storage battery including a lead containing grid, a paste formulation carried by said grid and including means for retarding corrosion of said grid comprising an intimate mixture of from .005% up to .5% by weight each of cobalt sulphate and silver sulphate admixed with the lead oxide of said paste.

2. In an acid storage battery including a lead containing grid and a cellulose plate separator immersed in an electrolyte, means for preserving said grid and separator which comprises an intimate mixture of about .07% cobalt sulphate and about .25% silver sulphate admixed in the paste formulation carried by said grid.

3. In a lead-acid storage battery including a lead containing grid, a paste formulation carried by said grid consisting mainly of lead oxide and including means for retarding corrosion of said grid comprising an intimate mixture of approximately 0.07% cobalt sulphate by weight and approximately 0.25% silver sulphate by weight admixed with the lead oxide of said paste.

4. In an acid storage battery, a cell, a liquid electrolyte in the cell, a positive lead-containing grid in the cell and immersed in the electrolyte, a separator formed of cellulose material disposed against the grid and immersed in the electrolyte, and an oxide paste carried by said grid and having intimately admixed therein cobalt and silver bearing compounds each comprising from .005% to .5% of the mixture.

5. For use in a lead-acid storage battery including a lead containing grid, a paste formulation adapted to be pressed into said grid and comprising a powder dry intimate admixture of lead oxides and cobalt sulfate and silver sulphate in powdered form each comprising from .005% to .5% of the mixture.

6. For use in a lead-acid storage battery including a lead containing grid and a cellulose plate separator, a paste formulation adapted to be carried by said grid and comprising an intimate dry mixture in powder form of lead oxide and approximately .07% cobalt sulphate and approximately .25% silver sulphate, said formulation being adapted to be wetted by acid and water to provide a paste to be carried by said grid.

References Cited in the file of this patent
UNITED STATES PATENTS

| | | |
|---|---|---|
| 368,608 | Peyrusson | Aug. 23, 1887 |
| 1,161,398 | Luthy | Nov. 23, 1915 |
| 1,826,724 | Booss et al. | Oct. 13, 1931 |
| 1,924,439 | Kersten | Aug 29, 1933 |
| 1,944,066 | Chamberlain | Jan. 16, 1934 |

FOREIGN PATENTS

| | | |
|---|---|---|
| 159,154 | Australia | Feb. 12, 1953 |
| 717,796 | Great Britain | Nov. 3, 1954 |